(12) United States Patent
Johansson et al.

(10) Patent No.: US 10,978,865 B2
(45) Date of Patent: Apr. 13, 2021

(54) CIRCUIT FOR BREAKING ALTERNATING CURRENT

(71) Applicant: Blixt Tech AB, Stockholm (SE)

(72) Inventors: Jan Johansson, Solna (SE); Henrik Borg, Norsborg (SE)

(73) Assignee: Blixt Tech AB, Stockholm (SE)

( * ) Notice: Subject to any disclaimer, the term of this patent is extended or adjusted under 35 U.S.C. 154(b) by 322 days.

(21) Appl. No.: 16/067,453

(22) PCT Filed: Jan. 19, 2017

(86) PCT No.: PCT/SE2017/050047
§ 371 (c)(1),
(2) Date: Jun. 29, 2018

(87) PCT Pub. No.: WO2017/127013
PCT Pub. Date: Jul. 27, 2017

(65) Prior Publication Data
US 2019/0027922 A1    Jan. 24, 2019

(30) Foreign Application Priority Data
Jan. 19, 2016   (SE) .................................... 1650057-1

(51) Int. Cl.
*H02H 3/20*   (2006.01)
*H02H 3/02*   (2006.01)
(Continued)

(52) U.S. Cl.
CPC .............. *H02H 3/021* (2013.01); *H02H 3/08* (2013.01); *H02H 3/20* (2013.01); *H02H 3/385* (2013.01); *H02H 1/0007* (2013.01); *H02H 3/025* (2013.01)

(58) Field of Classification Search
CPC ............ H02H 3/021; H02H 3/08; H02H 3/20; H02H 3/385; H02H 3/025; H01H 1/0007
(Continued)

(56) References Cited

U.S. PATENT DOCUMENTS

| 4,429,339 A | * | 1/1984 | Jaeschke ............ H03K 17/0822 330/207 P |
| 5,164,872 A | | 11/1992 | Howell |

(Continued)

FOREIGN PATENT DOCUMENTS

CA    2427039 A1    10/2004

*Primary Examiner* — Thienvu V Tran
*Assistant Examiner* — Bart Iliya
(74) *Attorney, Agent, or Firm* — Blank Rome LLP

(57) ABSTRACT

The present invention relates to a circuit (100) for breaking alternating current, the circuit (100) comprising: an input (102) arranged to receive an alternating current (AC); an output (104) arranged to provide the alternating current (AC) to at least one electrical load (200n); at least one controllable switch (106; 108) coupled between the input (102) and the output (104); an impedance network (Z) coupled between the input (102) and the output (104); a controller (110) coupled to a reference ground (112) common to the controller (110) and the at least one controllable switch (106; 108), wherein the controller (110) is arranged to measure at least one measuring voltage (V1; V2) between a node of the impedance network (Z) and the reference ground (112) and to control the at least one controllable switch (106; 108), so as to control the breaking of the alternating current (AC) provided to the at least one electrical load (200n), based on the value of the measured at least one measuring voltage (V1; V2).

12 Claims, 13 Drawing Sheets

(51) Int. Cl.
*H02H 1/00* (2006.01)
*H02H 3/08* (2006.01)
*H02H 3/38* (2006.01)

(58) Field of Classification Search
USPC .......................................................... 361/86
See application file for complete search history.

(56) References Cited

U.S. PATENT DOCUMENTS

| | | | |
|---|---|---|---|
| 5,650,901 A * | 7/1997 | Yamamoto | H01H 9/542 |
| | | | 361/100 |
| 2003/0160517 A1 | 8/2003 | Lo et al. | |
| 2009/0201617 A1* | 8/2009 | Yamaguchi | H01H 9/40 |
| | | | 361/93.9 |
| 2009/0256534 A1* | 10/2009 | Videtich | H01H 47/325 |
| | | | 323/235 |
| 2010/0070217 A1 | 3/2010 | Shimada et al. | |
| 2010/0145542 A1 | 6/2010 | Chapel et al. | |
| 2011/0121752 A1 | 5/2011 | Newman, Jr. et al. | |
| 2011/0309816 A1* | 12/2011 | Simon | H02H 3/08 |
| | | | 323/311 |
| 2014/0009189 A1 | 1/2014 | Mauder et al. | |
| 2015/0293570 A1 | 10/2015 | Lo et al. | |

\* cited by examiner

CIRCUIT FOR BREAKING ALTERNATING CURRENT

TECHNICAL FIELD

The present invention relates to a circuit for breaking alternating current.

BACKGROUND

Circuits for breaking alternating current (AC) is known in the art.

One solution is the well-known fuse which breaks the current if an applied current is larger than a nominal value, i.e. an overcurrent. The applied current is broken as the metal wire or strip of the fuse melts due to the overcurrent.

Another solution known in the art is a circuit breaker which is arranged to protect electrical circuits, including electrical loads, from damage caused by overcurrent. Unlike the fuse, the circuit breaker can be reset manually or automatically to resume normal operation.

SUMMARY

An objective of embodiments of the present invention is to provide a solution which mitigates or solves the drawbacks and problems of prior art.

The above and further objectives are achieved by the subject matter of the independent claim. Further advantageous implementation forms of the present invention are defined by the dependent claims and other embodiments.

According to an aspect of the invention, the above mentioned and other objectives are achieved with a circuit for breaking alternating current, the circuit comprising:
- an input arranged to receive an alternating current;
- an output arranged to provide the alternating current to at least one electrical load;
- at least one controllable switch coupled between the input and the output;
- an impedance network coupled between the input and the output;
- a controller coupled to a reference ground common to the controller and the at least one controllable switch, wherein the controller is arranged to measure at least one measuring voltage between a node of the impedance network and the reference ground and to control the at least one controllable switch, so as to control the breaking of the alternating current provided to the at least one electrical load, based on the value of the measured at least one measuring voltage.

The at least one controllable switch and the impedance network are coupled in series between the input and the output. By measuring the measuring voltage at the impedance network the controller can detect an overcurrent and/or short circuit and therefore open the at least one controllable switch so as to avoid damage on circuits and the at least one electrical load.

In one embodiment of the first aspect of the circuit for breaking AC, the circuit further comprises a driver circuit coupled between the controller and the at least one controllable switch, wherein the driver circuit is arranged to amplify control signals used by the controller for controlling the at least one controllable switch.

The control signals from the controller have often too low voltage or current which means that the at least one switch does not open or close as desired. The driver circuit solves this problem by amplifying the control signals transmitted by the controller.

In another embodiment of the above mentioned aspect of the circuit for breaking AC, the circuit comprises a first controllable switch and a second controllable switch coupled in series with each other and being arranged between the input and the output.

In yet another embodiment of the mentioned aspect of the circuit for breaking AC, the impedance network is coupled between the first controllable switch and the second controllable switch.

In yet another embodiment of the mentioned aspect of the circuit for breaking AC, the controller is further arranged to measure a first measuring voltage between a first node of the impedance network and the reference ground and a second measuring voltage between a second node of the impedance network and the reference ground, and to control the at least one controllable switch based on the value of the first measured measuring voltage and the second measured measuring voltage. The first node and the second node are different nodes of the impedance network.

By using both the first and second measuring voltages the controller can detect both short circuit (the first measuring voltage) and overcurrent (the second measuring voltage). Thereby, improved detection is possible. Further, the first and second measuring voltages can be used for determining power consumption pattern of the at least one load and/or determining the type of the at least one electrical load.

In yet another embodiment of the mentioned aspect of the circuit for breaking AC, the impedance network comprises a limiting/delay circuit coupled between the first controllable switch and the second controllable switch, wherein the limiting/delay circuit is arranged to limit/delay the speed of changes of the alternating current.

With the limiting/delay circuit it is possible to detect an overcurrent and open the at least one controllable switch before the current has reached damaging levels since the limiting/delay circuit limits/delays the overcurrent.

In yet another embodiment of the mentioned aspect of the circuit for breaking AC, the limiting/delay circuit comprises an inductor. The limiting/delay is a choke coil according to an embodiment.

In yet another embodiment of the mentioned aspect of the circuit for breaking AC, the at least one controllable switch is a Field Effect Transistor, FET.

In yet another embodiment of the mentioned aspect of the circuit for breaking AC, the first controllable switch and the second controllable switch are in opposite coupled between the input and the output.

With the first and second FETs coupled in opposite directions the alternating current is blocked in both directions.

In yet another embodiment of the mentioned aspect of the circuit for breaking AC, the reference ground is different from the ground for the at least one electrical load.

By having a reference ground different from the ground for the load smaller and cheaper electrical components can be used since mentioned electrical components do not have to be adapted to high voltages, such as 230 and 110 volts. Further, the present circuit for breaking alternating current can be coupled and mounted in conventional circuit breakers.

In yet another embodiment of the mentioned aspect of the circuit for breaking AC, the controller is further arranged to monitor the power consumption pattern of the at least one electrical load, control the at least one controllable switch based on the monitored power consumption pattern of the at least one electrical load.

In yet another embodiment of the mentioned aspect of the circuit for breaking AC, the controller is further arranged to determine the type of the at least one electrical load based on the monitored power consumption pattern.

In yet another embodiment of the mentioned aspect of the circuit for breaking AC, the controller is further arranged to control the at least one controllable switch based on the determined type of the at least one electrical load.

In yet another embodiment of the mentioned aspect of the circuit for breaking AC, the controller is further arranged to transmit any of the monitored power consumption pattern and determined type for the at least one load to another controller or system.

In yet another embodiment of the mentioned aspect of the circuit for breaking AC, the controller is further arranged to
receive any of at least one information element and at least one instruction associated with the at least one electrical load,
control the at least one controllable switch based on any of the at least one information element and the at least one instruction.

In yet another embodiment of the mentioned aspect of the circuit for breaking AC, the controller comprises any of wireless receiving means and wired receiving means arranged to receive communication signals comprising an indication of any of the at least one information element and the at least one instruction element. This means that the controller may comprise wireless receiving means only, wired receiving means, or wireless and wired receiving means.

In yet another embodiment of the mentioned aspect of the circuit for breaking AC, the at least one electrical load is any of a household appliance and an electrical heater. The electrical load may be any electrical device that is connected to the output of the circuit for breaking AC and is configured to be fed with AC.

Further applications and advantages of the present invention will be apparent from the following detailed description.

BRIEF DESCRIPTION OF THE DRAWINGS

The appended drawings are intended to clarify and explain different embodiments of the present invention, in which.

DETAILED DESCRIPTION

Figure 1:
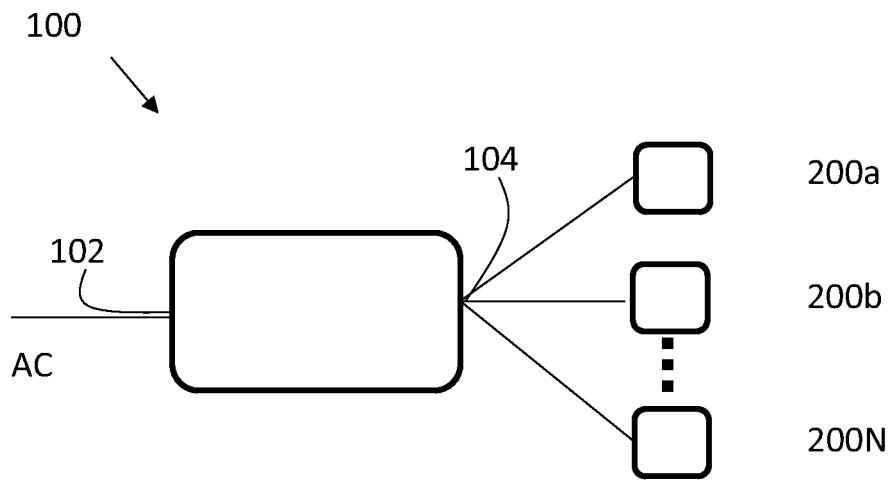
FIG. 1 shows a circuit according to an embodiment of the invention.

FIG. 1 schematically illustrates a circuit 100 for breaking alternating current according to an embodiment of the invention. The circuit 100 is coupled to one or more electrical loads 200a, 200b, . . . 200N (having index n=a, b, . . . , N). An alternating current (AC) is feed to the input 102 of the circuit 100 and forwarded to the loads 200a, 200b, . . . 200N via the output 104 of the circuit 100. The current is in one embodiment so called mains alternating current. The loads 200a, 200b, . . . 200N may therefore be household appliances and/or electrical heaters and/or other household electronics.

Figure 2:
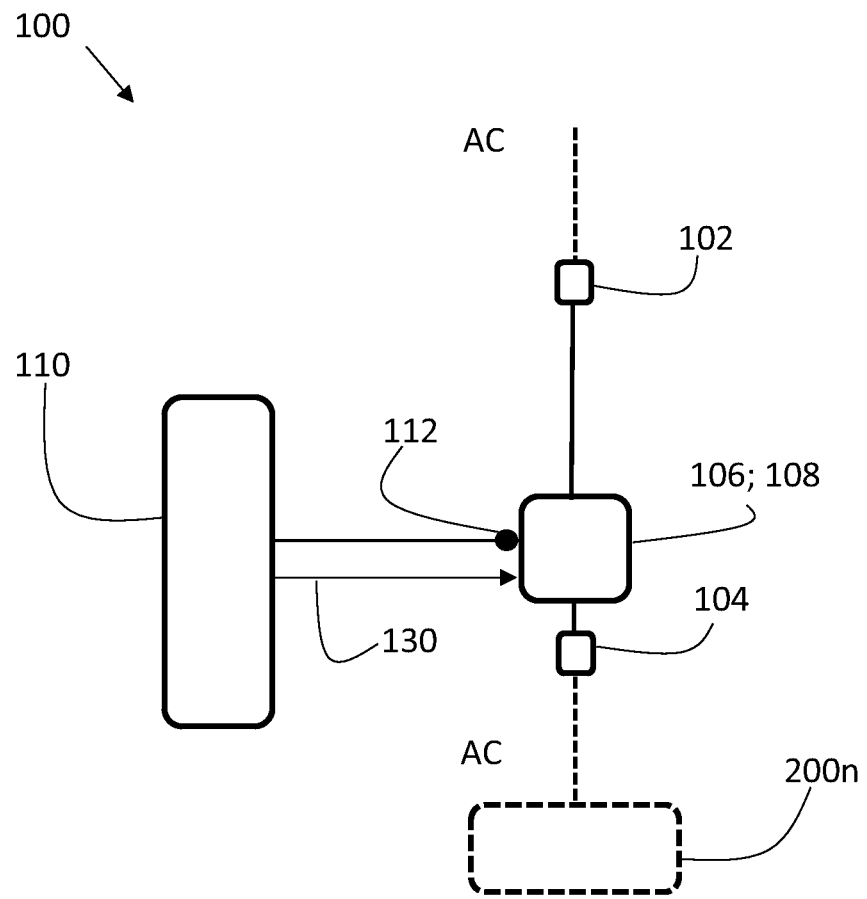
FIG. 2 shows a circuit according to an embodiment of the invention.

FIG. 2 shows another embodiment of a circuit 100 for breaking alternating current according to the invention. The circuit 100 comprises an input 102 arranged to receive current, and an output 104 arranged to provide the current to at least one electrical load 200n. The circuit 100 further comprises at least one controllable switch 106; 108 coupled between the input 102 and the output 104. Moreover, the circuit 100 comprises a controller 110 coupled to a reference ground 112 common to the controller 110 and the at least one controllable switch 106; 108. The controller 110 is arranged to control the at least one controllable switch 106; 108 so as to control the breaking of the current provided to the at least one electrical load 200n via the output 104. The reference ground 112 is used and function as a reference potential for measuring one or more voltage differences in the present circuit breaker 100.

The at least one controllable switch 106; 108 may be any in the group comprising: relay, thyristor, triac, gate turn off thyristor, transistor and any other type of silicon controlled rectifier. The controlling of the at least one controllable switch 106; 108 may be performed using control means 130 coupled between the controller 110 and the least one controllable switch 106; 108 as shown in FIG. 2. The control means 130 may carry control signals, e.g. one or more different control voltages or currents which may have different levels, for opening and closing the at least one controllable switch 106; 108. If an overcurrent is detected the least one controllable switch 106; 108 is switched open and thereby breaking the applied current.

Figure 3:
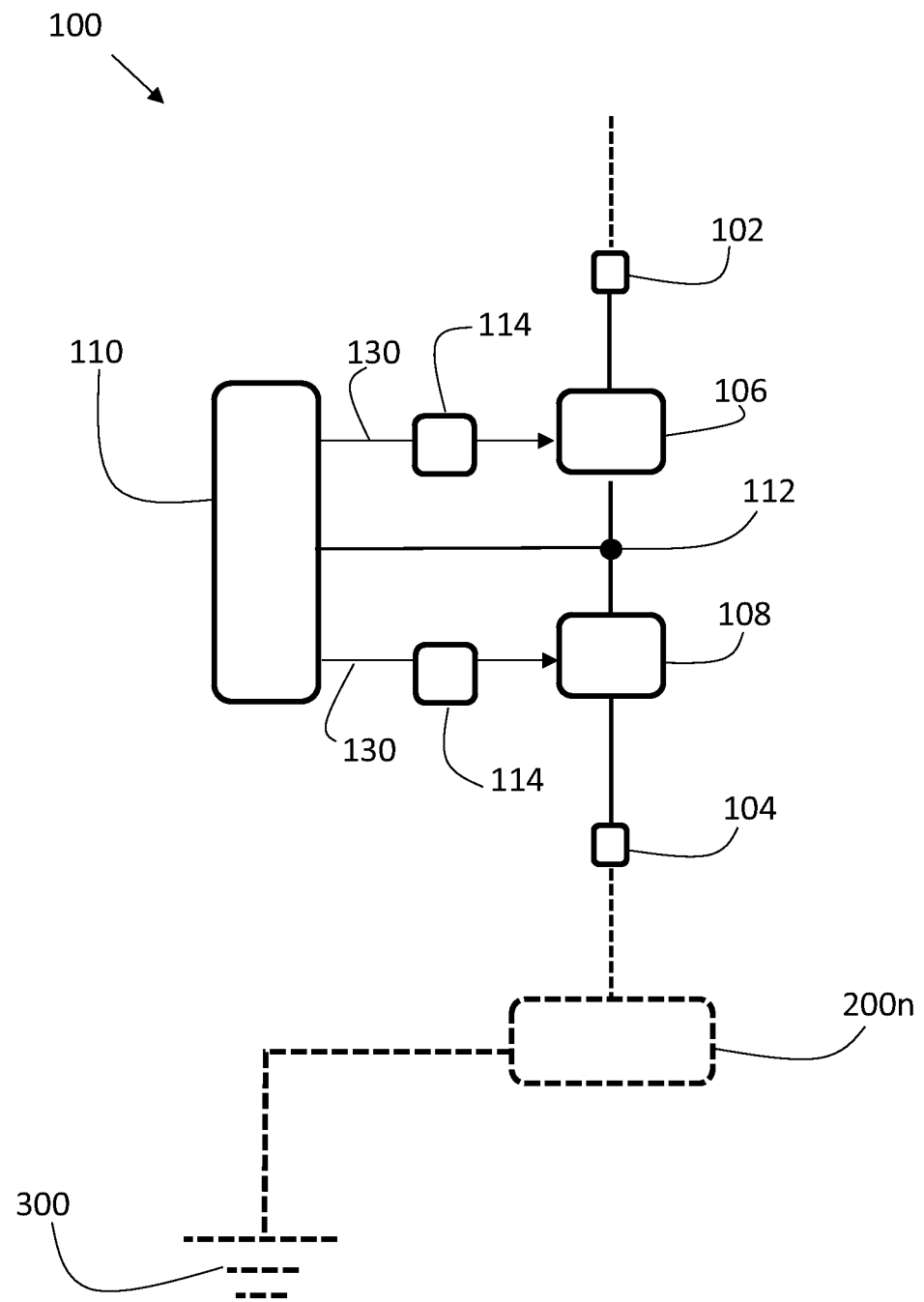
FIG. 3 shows a circuit according to an embodiment of the invention.

FIG. 3 shows yet another embodiment of a circuit 100 for breaking alternating current according to the invention. The circuit 100 in this embodiment comprises two controllable switches, i.e. a first controllable switch 106 and a second controllable switch 108 which are coupled in series with each other and being arranged between the input 102 and the output 104 as shown in FIG. 3. The switches 106, 108 are in one embodiment Field Effect Transistors (FETs) which are opposite coupled serially between the input 102 and the output 104. A FET blocks the current in one direction and hence the two FETs in this embodiment are coupled in opposite direction relative to the direction of the current. The FETs have a fast switching time (time period for opening or closing the switch) which means that the current through the FETs can be broken very fast when an overcurrent is detected thereby limiting or eliminating damage to circuits and loads coupled to the output 104. Preferably, the two FETs are in one embodiment controlled with the same control means using a common gate voltage thereby simplifying the architecture. The example in FIG. 3 shows that the controller 110 controls the switches 106, 108 via separate control means 130. However, the controller 110 may also control the switches 106, 108 via common control means 130 as described above.

In one embodiment the circuit 100 comprises at least one driver circuit 114 coupled between the controller 110 and the controllable switches 106, 108. The driver circuit 114 is arranged to amplify control signals used by the controller 110 for controlling the switches 106, 108 via the control means 130. This may be needed e.g. when any of the control voltage and current transmitted to the controllable switch has to be boosted. For example, the driver circuit 114 can be arranged to be fed with 10-15 Volts and deliver this voltage to the gate side of the FET.

It is also noted in FIG. 3 that the reference ground 112 is different from the ground for the at least one electrical load 200n which is denoted 300 in FIG. 3. The at least one electrical load 200n often have a common ground and in the present solution the common ground is different from the reference ground 112.

Figure 4A:
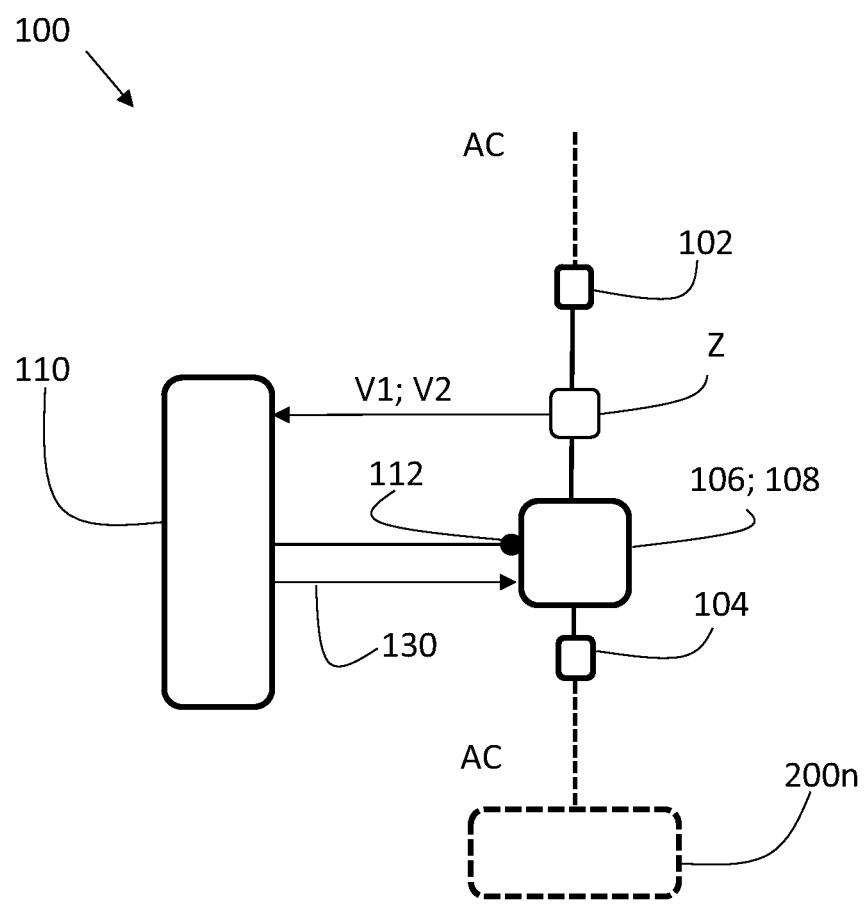
FIGS. 4a-c show circuits according to embodiments of the invention.

FIG. 4a shows yet another embodiment of a circuit 100 for breaking alternating current which in this case comprises an impedance network Z coupled between the at least one controllable switch 106; 108 and the input 102. The controller 110 is arranged to measure at least one measuring voltage V1; V2 at the impedance network Z and to control the at least one controllable switch 106; 108 based on the value of the at least one measured measuring voltage V1; V2. In other words, the controller 110 controls the breaking of the alternating current AC provided to the at least one electrical load 200n, based on the value of the measured at least one measuring voltage V1; V2. The at least one measured measuring voltage V1; V2 is measured as a difference in potential between a node at the impedance network Z and the reference ground 112. The at least one measuring voltage V1; V2 can be used by the controller 110 for detecting short circuit and/or overcurrent. Therefore, by using the at least one measuring voltage V1; V2 the at least one electrical load 200n and circuits can be protected.

The impedance network Z may be configured so that at least one measuring voltage V1; V2 can be measured/detected/provided at the network Z. One solution is to have a measuring resistor (not shown in FIG. 4a) over which a measuring voltage is measured. A reference value for the resistance of the measuring resistor may e.g. be approximately 0.01 Ohm or lower for AC mains, e.g. 110 or 230 Volts. The measuring voltage may be compared with a threshold voltage in a comparator (not shown in FIG. 4a) and if the measuring voltage exceeds the threshold voltage, the at least one controllable switch 106; 108 are controlled to take an open position so as to prevent that an overcurrent damages circuits/components and/or the at least one electrical load coupled to the output 104. Hence, the at least one measuring voltage V1; V2 is used for detecting overcurrent.

Figure 6:
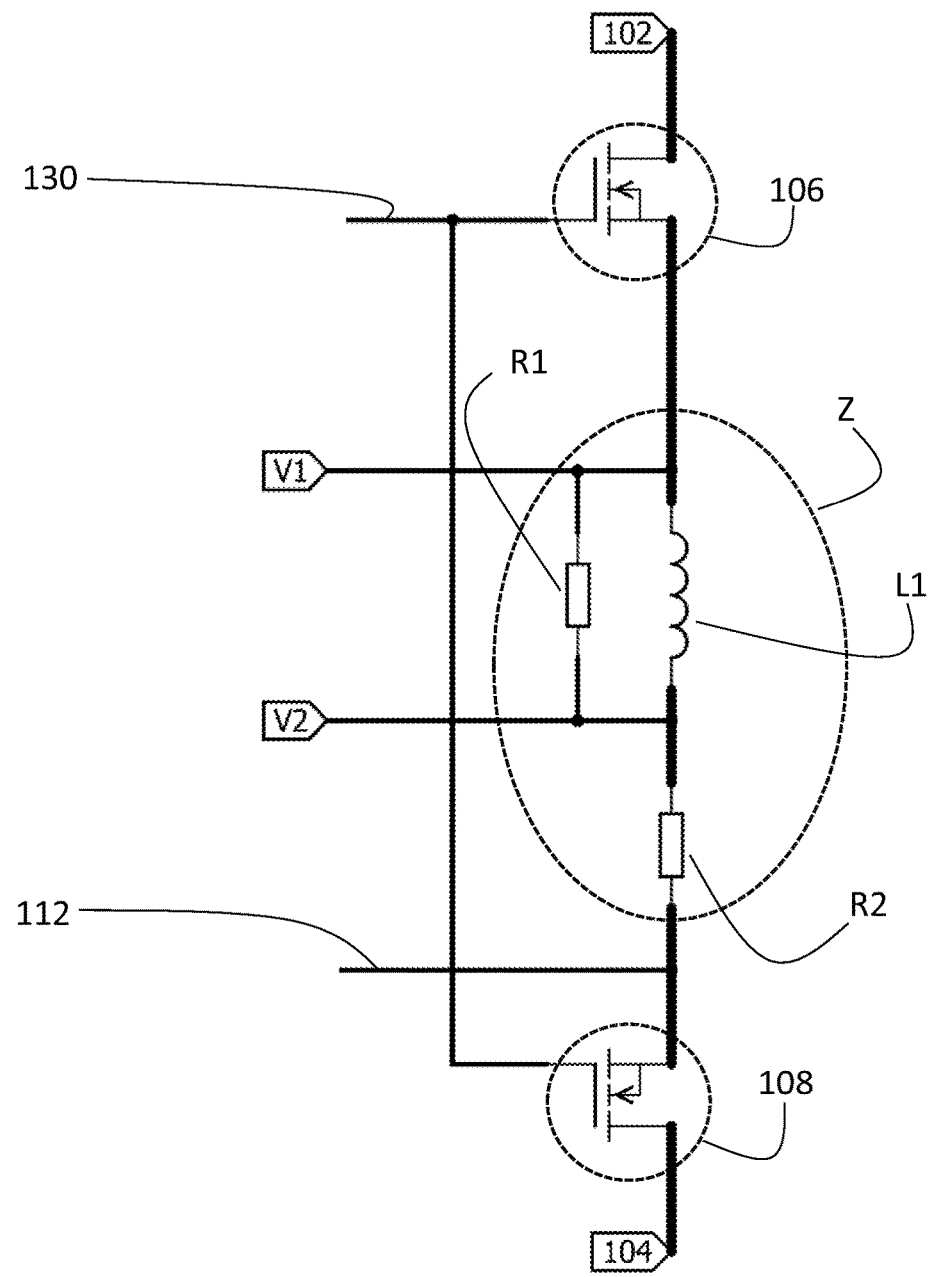
FIG. 6 shows an impedance network according to an embodiment of the invention.

In the embodiment shown in FIG. 4a, the controller 110 can further be arranged to measure a first measuring voltage V1 which is a voltage difference between the reference ground 112 and a first node at the impedance network Z; and to measure a second measuring voltage V2 which is a voltage difference between the reference ground 112 and a second node at the impedance network Z. An example of the first measuring voltage V1 and the second measuring voltage V2 is shown in FIG. 6.

The controller 110 is configured to control the at least one controllable switch 106; 108 based on the value of the first measured measuring voltage V1 and the value of the second measured measuring voltage V2. The first measured measuring voltage V1 can be related to the change of load coupled to the output 104 and can thereby indicate a short circuit. The second measured measuring voltage V2 can be directly proportional to the current passing through the present circuit 100 and can thereby indicate overcurrent.

Figure 4B:
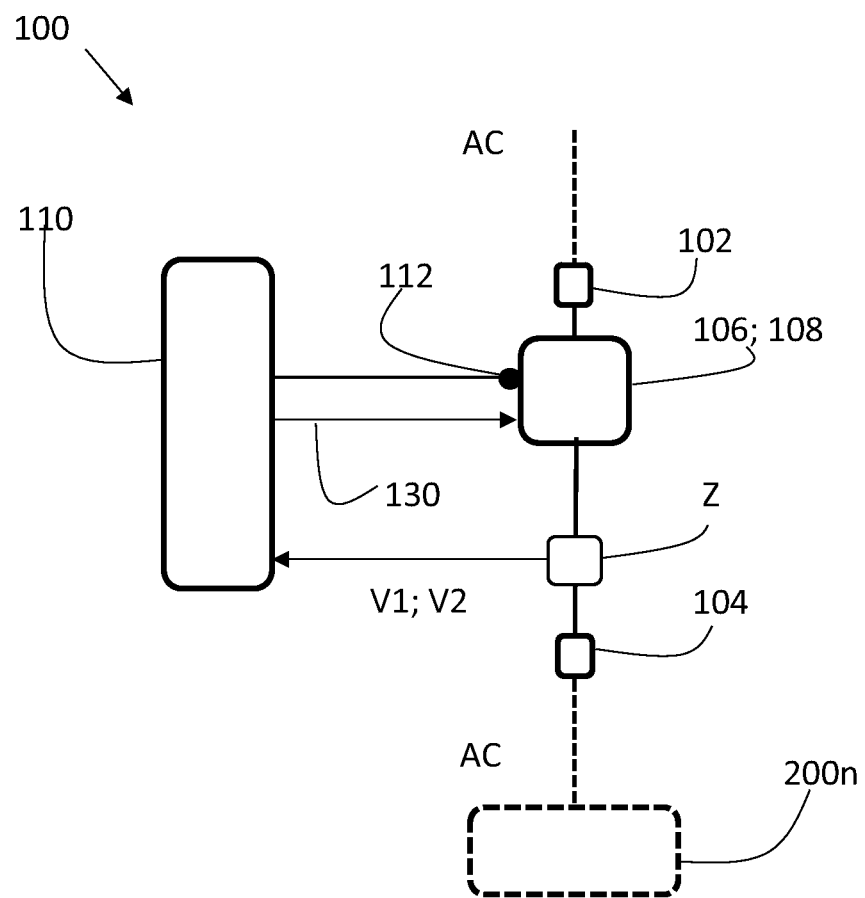

In the embodiment of the circuit 100 shown in FIG. 4a, the impedance network Z is coupled between the at least one controllable switch 106; 108 and the input 102. However, the impedance network Z may in some embodiments instead be coupled between the at least one controllable switch 106; 108 and the output 104. A circuit 100 according to one such embodiment is shown in FIG. 4b. In the same way as in the embodiment shown in FIG. 4a, the controller 110 in the embodiment shown in FIG. 4b is arranged to measure at least one measuring voltage V1; V2 between a node of the impedance network Z and the reference ground 112 and to control the at least one controllable switch 106; 108, so as to control the breaking of the alternating current AC provided to the at least one electrical load 200n, based on the value of the measured at least one measuring voltage V1; V2.

The impedance network Z shown in FIG. 4b should be configured so that one or more measuring voltage V1; V2 can be measured at the impedance network Z, as described above with reference to FIG. 4a. Hence, the controller 110 shown in FIG. 4b can be arranged to measure a first measuring voltage V1, a second measuring voltage V2, or both a first measuring voltage V1 and a second measuring voltage V2 and the controller 110 can control the at least one controllable switch 106; 108 based on the value of the first measured measuring voltage V1 and/or the value of the second measured measuring voltage V2. The first measured measuring voltage V1 can e.g. indicate short circuit and the second measured measuring voltage V2 can e.g. indicate overcurrent, as described above with reference to FIG. 4a.

Figure 4C:
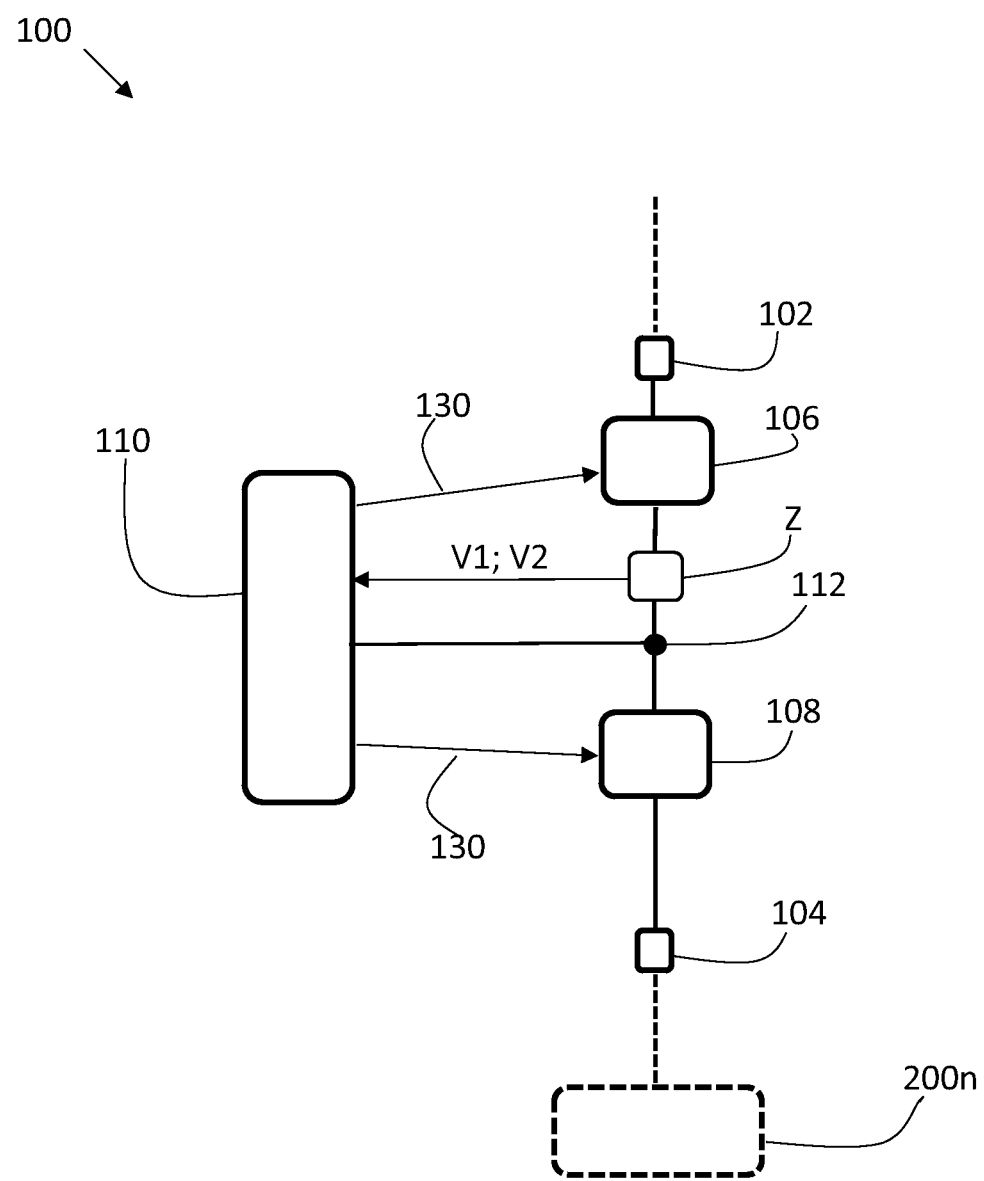

FIG. 4c shows yet another embodiment of a circuit 100 for breaking alternating current which in this particular case comprises two controllable switches 106, 108 with an impedance network Z coupled between the first controllable switch 106 and the second controllable switch 108. The controller 110 is therefore arranged to measure at least one measuring voltage V1; V2 at the impedance network Z and to control the first controllable switch 106 and the second controllable switch 108 based on the value of the measured measuring voltage V1; V2. The at least one measured measuring voltage V1; V2 is measured as a difference in potential between a node at the impedance network Z and the reference ground 112. The at least one measuring voltage V1; V2 can be used by the controller 110 for detecting short circuit and/or overcurrent. Therefore, by using the at least one measuring voltage V1; V2 the at least one electrical load 200n and circuits can be protected.

The impedance network Z should be configured so that one or more measuring voltages V1; V2 can be measured at the impedance network Z, as described above with reference to FIG. 4a. Hence, the controller 110 shown in FIG. 4c can be arranged to measure a first measuring voltage V1, a second measuring voltage V2, or both a first measuring voltage V1 and a second measuring voltage V2 and the controller 110 can control the first controllable switch 106 and the second controllable switch 108 based on the value of the first measured measuring voltage V1 and/or the value of the second measured measuring voltage V2. The first measured measuring voltage V1 can e.g. indicate short circuit and the second measured measuring voltage V2 can e.g. indicate overcurrent, as described above with reference to FIG. 4a.

In one further embodiment the impedance network Z, positioned according to any of the described embodiments, comprises a limiting/delay circuit (see FIG. 6). The limiting/delay circuit is arranged to limit/delay the speed of changes of the current, e.g. an overcurrent. The limitation/delay is preferably of the order so that the controller 110 via the at least one controllable switch 106; 108 has time to detect an overcurrent and break the current before the overcurrent reaches the circuits or the at least one electrical load connected to the output 104. The overcurrent also known as overload is often due to short circuits, overloading of electrical loads, mismatch of electrical loads, and electrical device failures.

There are a number of different solutions for providing a limiting/delay circuit. In one solution, the limiting/delay circuit comprises an inductor shown as L1 in FIG. 6.

FIG. 6 shows an embodiment comprising a first FET 106 and a second FET 108 coupled in series in opposite direction relative the current between the input 102 and the output 104. The two FETs are controlled by the same control means 130 using the same control voltage as gate voltage. The circuit 100 further comprises an impedance network Z coupled between the FETs and at which a first measuring voltage V1 and a second measuring voltage V2 are measured.

The impedance network Z includes, according to an embodiment, a first resistor R1 coupled in parallel with an inductor L1. The first resistor R1 and the inductor L1 may be coupled together in series with a second resistor R2. According to some embodiments, the second resistor R2 may be omitted. The first voltage V1 is available/measured/detected (as a potential difference) between a potential of a first node and the reference ground 112. The first node is located between the first controllable switch 106 and the parallel coupling of the first resistor R1 and the inductor L1. The reference ground 112 is here different from a reference voltage for the at least one electrical load 200n, which may be a zero/neutral voltage, an earthed/grounded neutral voltage, a protective earth/ground voltage, another phase and/or another suitable reference potential of a network to which the at least one load 200n is connected. The first voltage V1 is related to the change of the load coupled to the output 104, and thus indicates a short circuit.

The second voltage V2 is available/measured (as a potential difference) between a second node and the reference ground 112. The reference 112 is different from the reference voltage for the at least one electrical load 200n, as mentioned above. The second node is located between the second resistor R2 and the parallel coupling of the first resistor R1 and the inductor L1. Hence, the second voltage V2 is obtained over the second resistor R2, and is directly proportional to the current flowing through the second resistor R2, and thus also through the alternating current breaking circuit 100, and indicates overcurrent. The second voltage V2 is therefore also suitable for monitoring the power consumption of the at least one load 200n and may be used for determining the power consumption pattern. Further, at low frequencies, the alternating current AC passes through the inductor L1, i.e. the inductor L1 is essentially a shortcut, and the second resistor R2, which in that case gives the relation that the first and second voltages are equal, i.e. V1=V2. If the one or more loads coupled to the output 104 are changing quickly (which can be seen as a high frequency signal), then inductor L1 has a high impedance and acts as a current brake or stopper. The voltage over the inductor L1 is thus related to the frequency, and may therefore be very high, since the impedance increases with increasing frequency. In this case, the first resistor R1 acts as a current shunt preventing that the voltage gets too high. According to an embodiment, at least one protection circuit, including e.g. at least one diode having a Zener functionality, is coupled in parallel with the inductor L1 and the first resistor R1.

Further applications of the present invention may relate to power consumption of the at least one electrical load and the controlling of the at least one electrical load.

In one embodiment, the controller 110 is arranged to monitor the power consumption pattern of the at least one electrical load 200n and to control the at least one controllable switch 106; 108 based on the monitored power consumption pattern of the at least one electrical load 200n. The power consumption pattern can be monitored by using and analysing the measured/detected/provided at least one voltage V1; V2 described above. Thereby, the controller 110 can adapt the current fed to the load depending on the type of the load. For example, shut down the load for safety reasons or providing a higher or lower amount of current. Also, the controller 110 may be arranged to control the at least one controllable switch 106; 108 such that breaking of the alternating current AC is effected if the power consumption pattern is irrational, i.e. is the power consumption pattern appears to be unexpected and/or disadvantageous, e.g. including transients, steps, or other sudden changes.

In this respect the controller 110 may be further arranged to determine the type of the at least one load 200n based on the monitored power consumption pattern. Each type of load has its own power consumption pattern which can be identified. By using and analysing the measured/detected/provided at least one voltage V1; V2, as described above, the type of at least one load 200n can be determined. Hence, in this solution the controller 110 also has the capability to determine or identify the type of load which means that the at least one controllable switch 106; 108 can be controlled based on the determined or identified type of load.

Figure 5:
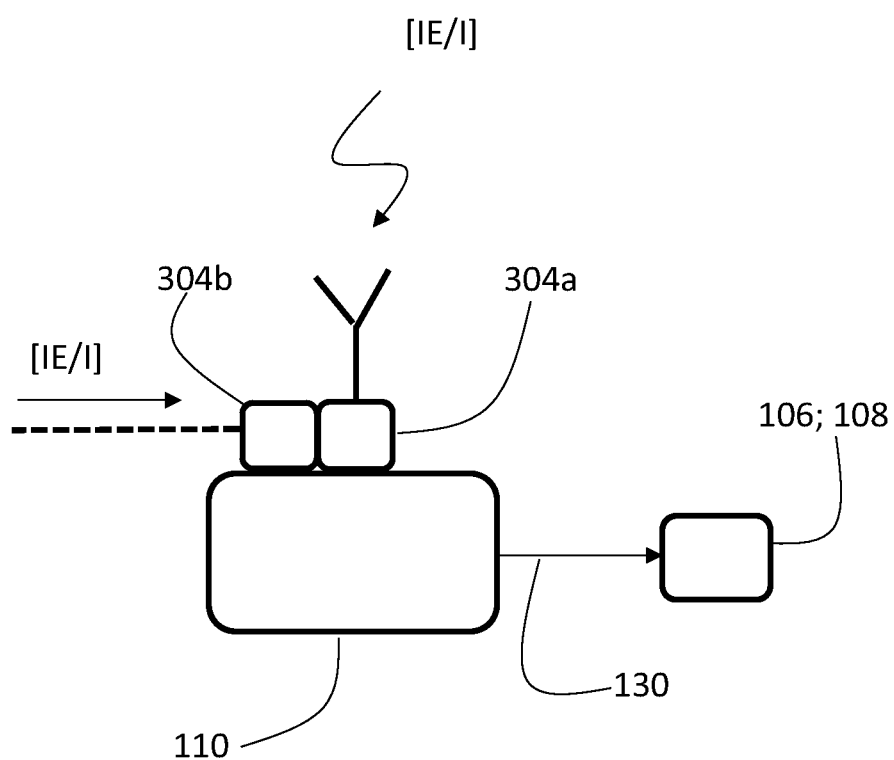
FIG. 5 shows a controller according to an embodiment of the invention.

In yet another embodiment the controller 110 is arranged to receive any of at least one information element IE and at least one instruction I associated with the at least one electrical load 200n. One such embodiment is shown in FIG. 5 in which the controller 110 is further arranged to control the at least one controllable switch 106; 108 based on any of the at least one information element IE and the at least one instruction I. Therefore, the controller 110 comprises any of wireless receiving means 304a and wired receiving means 304b arranged to receive communication signals comprising an indication of at least any of the at least one information element IE and the at least one instruction I. Mentioned instruction I may be internal primal functioning and/or external incoming instruction, e.g. defining working mode and/or working constant or variable for the controller 110. The information element IE and the instruction I can be transmitted in control signalling of known communication protocols. For example, 3GPP or WiFi or ITU standards may be used in this respect.

The controller 110 may also be arranged to combine the information element IE and the instruction I with any of monitored power consumption pattern of the at least one electrical load 200n and determined type of the at least one electrical load for controlling the at least one electrical load.

The controller 110 may further comprise transmitting wired/wireless communication means for transmitting monitored power consumption pattern of the at least one electrical load 200n and/or determined type of the at least one electrical load 200n to other controllers or control devices for further processing.

The controller 110 may be a standalone device such as the one illustrated in FIG. 5, but may in another embodiment be part of a distributed system where e.g. different functions of the controller 110 are located in spatially different locations. For example, the controller 110 may include a master controller and a plurality of slave controllers (not shown in the Figs.). The intelligence may be located in the master controller, which so to speak controls the slave controllers via suitable communication means being wireless and/or wired.

The controller 110 may be a micro controller and can comprise at least one processor for managing the communication and controlling the at least one controllable switch and/or slave controllers. Moreover, it is realized by the skilled person that the present controller 110 may comprise other necessary capabilities in the form of e.g., functions, means, units, elements, etc., for performing the present solution. Examples of other such means, units, elements and functions are: processors, memory, buffers, control logic, transmitters, receivers, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, TCM decoder, power supply units, power feeders, communication interfaces, communication protocols, etc. which are suitably arranged together for performing the present solution.

Especially, the processor or processors of the present controller 110 may comprise, e.g., one or more instances of a Central Processing Unit (CPU), a processing unit, a processing circuit, a processor, an Application Specific Integrated Circuit (ASIC), a microprocessor, a micro controller or other processing logic that may interpret and execute instructions. The expression "processor" may thus represent a processing circuitry comprising a plurality of processing circuits, such as, e.g., any, some or all of the ones mentioned above, or another known processor. The processing circuitry may further perform data processing functions for inputting, outputting, and processing of data comprising data buffering and device control functions, such as call processing control, user interface control, or the like.

Figure 7:
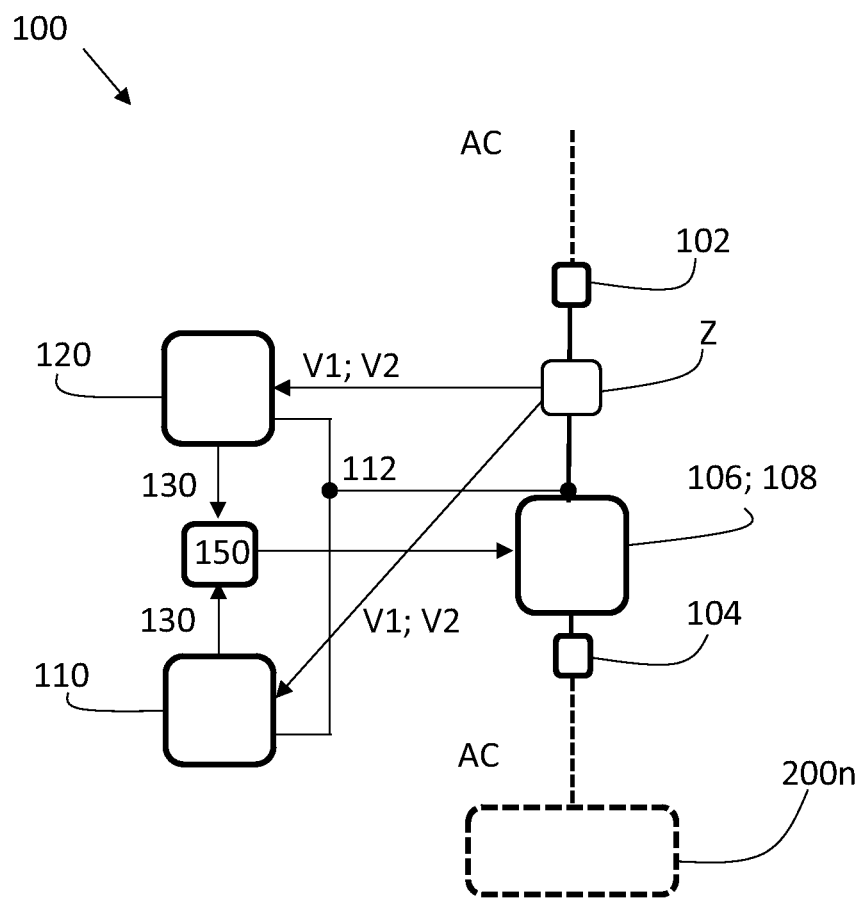
FIG. 7 shows a circuit according to an embodiment of the invention.

In some embodiments, a transistor network 120 may be added to the circuit 100 which together with the controller 110 provides a combined control of the at least one controllable switch 106; 108. FIG. 7 shows a circuit 100 according to such an embodiment, in which both the controller 110 and a transistor network 120 are used for controlling the at least one controllable switch 106; 108. The circuit 100 here comprises a controller 110 according to any one of the herein described embodiments. The circuit also comprises a transistor network 120 comprising at least one transistor $T_{TN1}$; $T_{TN2}$. The transistor network 120 being arranged to control the at least one controllable switch 106; 108, so as to control the breaking of the alternating current AC provided to the at least one electrical load 200n, based on a value of at least one voltage V1; V2 of at least one node of the impedance network Z. The circuit 100 further comprises a combining circuit 150 being arranged to provide a combined control of the at least one controllable switch 106; 108 based on the value of the at least one voltage V1; V2 by use of the controller 110 and the transistor network 120. Hereby, a combined control of the at least one controllable switch 106; 108 using both the controller 110 and the transistor network 120 is provided. The transistor network 120 may be coupled to the same reference ground 112 as the controller 110.

The transistor network 120 may be arranged to control the at least one controllable switch 106; 108 such that the breaking of the alternating current, may be effected very quickly. Thereby, the risk for damages of the loads 200n and/or the circuit 100 itself due to the current triggering the switching is very low. The control of the least one controllable switch 106; 108 being provided by the transistor network 120 may result in a much quicker switching, e.g. a 100-1000 times faster switching, than control provided by a controller circuit comprising a processor, such as the controller 110. The controller 110 on the other hand may be arranged to control the at least one controllable switch 106; 108 such that breaking of the alternating current AC is triggered for a low power consumption for the at least one electrical load 200n, e.g. for a lower power consumption than a power consumption that would trigger breaking of the alternating current AC when control is provided by the transistor network 120 alone. Thus, by the combined control of the at least one controllable switch 106; 108, using both the transistor network 120 and the controller 110, breaking of the alternating current AC may be effected both very quickly and already at very low power consumptions.

Figure 8:
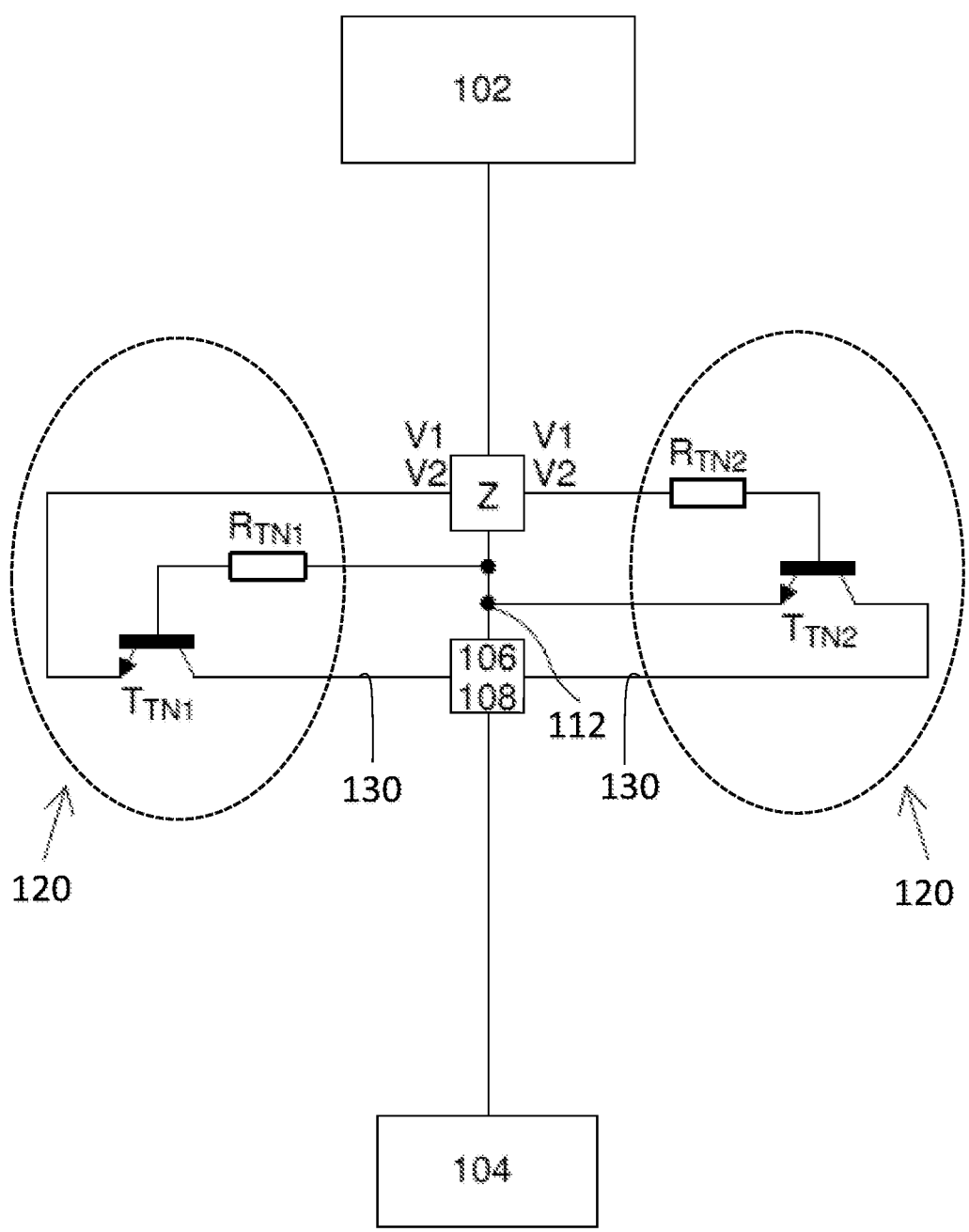
FIG. 8 shows a transistor network according to an embodiment of the invention.
Figure 9:
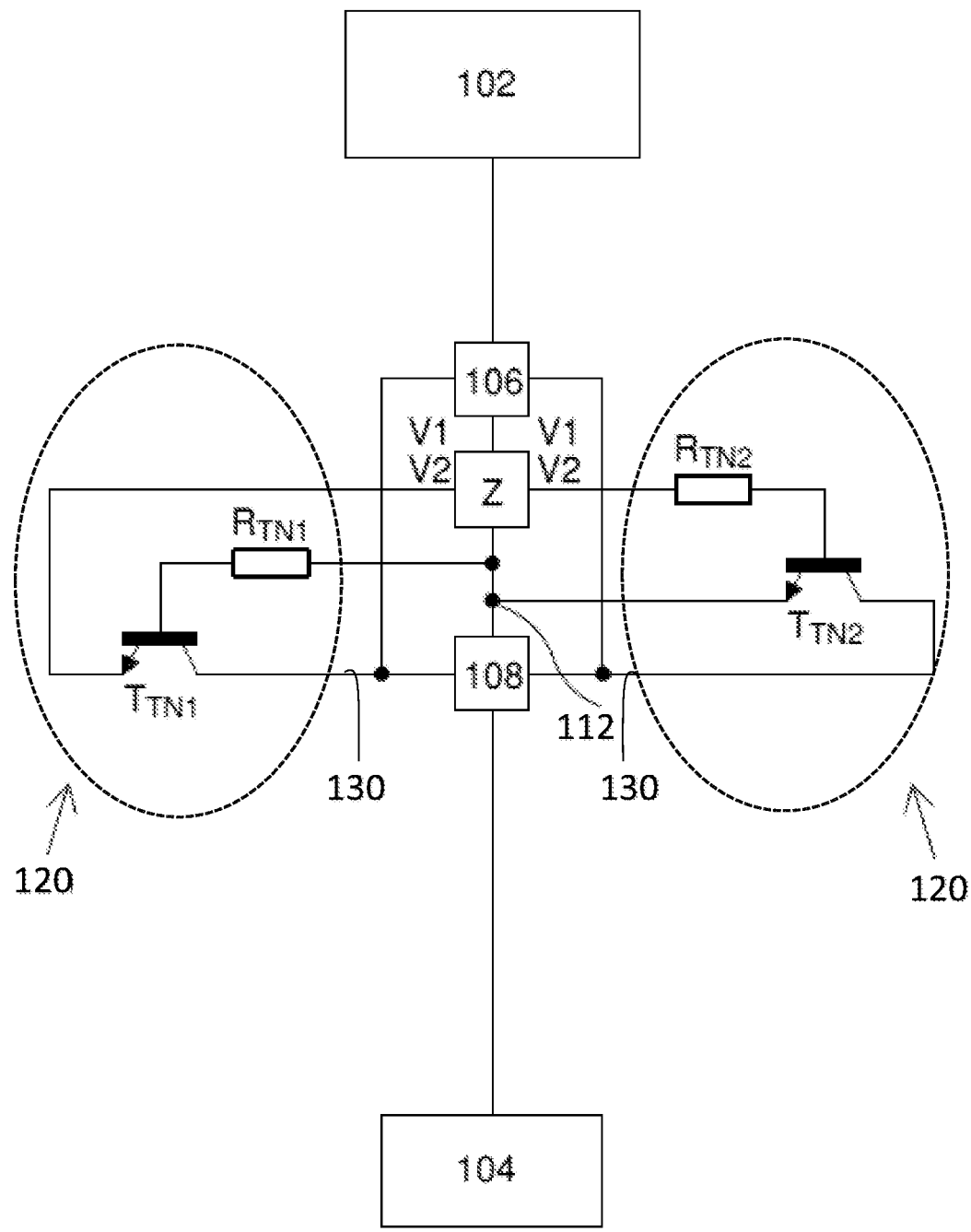
FIG. 9 shows a transistor network according to an embodiment of the invention.

FIGS. 8 and 9 schematically illustrate the transistor network 120 in more detail for some embodiments. The embodiment shown in FIG. 8 comprises at least one controllable switch 106; 108, while the embodiment shown in FIG. 9 comprises two controllable switches 106, 108. The transistor networks 120 of the embodiments shown in FIGS. 8 and 9 comprise two transistors $T_{TN1}$; $T_{TN2}$ arranged for controlling the at least one controllable switch 106; 108, such that breaking of the alternating current AC is controlled, based on the at least one voltage V1; V2 of the at least one node of the impedance network Z, as explained above.

The transistor network 120 may function as an autonomous network in some embodiments. An autonomous network is arranged to independently control the at least one controllable switch 106; 108 based only on the at least one voltage V1; V2. The transistor network 120 does thus not need to be controlled itself, and does also not, according to some embodiments, need to be externally supplied with voltage to perform the control of the at least one controllable switch 106; 108.

The transistor networks 120 described in this document may also, according to some embodiments, be arranged to function as voltage comparator circuits, i.e. circuits that control the at least one controllable switch 106; 108 based on at least one voltage comparison.

The transistor networks 120 may comprise at least one resistor $R_{TN1}$; $R_{TN2}$ coupled in series with a controlling input of the at least one transistor $T_{TN1}$; $T_{TN2}$. As shown in FIGS. 8 and 9, the transistor network 120 may comprise two resistors $R_{TN1}$, $R_{TN2}$, one resistor $R_{TN1}$; $R_{TN2}$ coupled in series with the controlling input of each one of the two transistors $T_{TN1}$, $T_{TN2}$.

In more detail, a first resistor $R_{TN1}$ may be coupled between a reference ground 112 node, located between the impedance network Z and the at least one controllable switch 106; 108, and the controlling input of the first transistor $T_{TN1}$, as illustrated in FIG. 8. For the embodiment shown in FIG. 9, having two controllable switches 106, 108, the first resistor $R_{TN1}$ may be coupled between a reference ground 112 node, located between the impedance network Z and the second controllable switch 108, and the controlling input of the first transistor $T_{TN1}$. Further, the emitter/source of the first transistor $T_{TN1}$ is coupled to at least one node of the impedance network Z having a potential corresponding to the at least one voltage V1; V2. The collector/drain of the first transistor $T_{TN1}$ is coupled, possibly directly or indirectly via a driver and/or a logic circuit, to the at least one controllable switch 106; 108.

A second resistor $R_{TN2}$ may be coupled between a node of the impedance network Z, e.g. the first node providing the at least one voltage V1; V2, and the controlling input of the second transistor $T_{TN2}$, as illustrated in FIGS. 8 and 9. Further, the emitter/source of the second transistor $T_{TN2}$ is coupled to the reference ground 112 node, located between the impedance network Z and the at least one controllable switch 106; 108. For the embodiment shown in FIG. 9, having two controllable switches 106, 108, the emitter/source of the second transistor $T_{TN2}$ is coupled to a reference ground 112 node located between the impedance network Z and the second controllable switch 108. The collector/drain of the second transistor $T_{TN2}$ is coupled, possibly directly or indirectly via a driver and/or a logic circuit, to the at least one controllable switch 106; 108.

The herein described one or more transistors $T_{TN1}$; $T_{TN2}$ may be bipolar junction transistors (BJT), having a base pin as a controlling input, or may be field effect transistors (FET), having a gate pin as a controlling input. Further, bipolar junction transistors also comprise an emitter pin and a collector pin, while field effect transistors also comprise a source pin and a drain pin.

The at least one resistor $R_{TN1}$; $R_{TN2}$ may have a resistance having a value being high enough for the at least one transistor $T_{TN1}$; $T_{TN2}$ to be protected against overcurrents. The at least one resistor $R_{TN1}$; $R_{TN2}$ may also have a resistance having a value being low enough for reducing a time period during which the at least one transistor $T_{TN1}$; $T_{TN2}$ operates in its linear region/mode.

Figure 10:
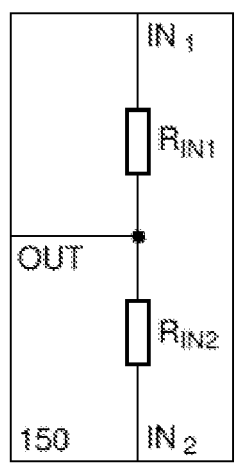
FIG. 10 shows a combining circuit according to an embodiment of the invention.

FIG. 10 shows an embodiment of the combining circuit 150 more in detail. The combining circuit 150 may, according to an embodiment comprise first $IN_1$ and second $IN_2$ inputs receiving control signals from the transistor network 120 and the controller 110, respectively. The combining circuit 150 may include first Rim and second $R_{IN2}$ resistors coupled in series between the first $IN_1$ and second $IN_2$ inputs, respectively, and an output coupled to a node between the first Rim and second $R_{IN2}$ resistors. Hereby, the combined control signal is provided by the output of the combining circuit 150 to the at least one controllable switch 106;108, as illustrated in FIG. 7. At least one driver circuit 114 may be coupled between the combining circuit 150 and the controllable switches 106, 108 (not shown in FIG. 7). The driver circuit 114 is, as mentioned above, arranged to amplify control signals used for controlling the switches 106, 108 via the control means 130.

As mentioned above, the impedance network Z may also be coupled between the at least one controllable switch 106; 108 and the output 104. Thus, embodiments corresponding to the ones shown in FIGS. 7-9, and described above, but with the impedance network Z instead coupled between the at least one controllable switch 106; 108 and the output 104 are also included within the scope of the present invention. These embodiments function corresponding to what is described above for each respective embodiment shown in FIGS. 7-9, with the difference that the impedance network Z is located differently, i.e. between the at least one controllable switch 106; 108 and the output 104.

Figure 11:
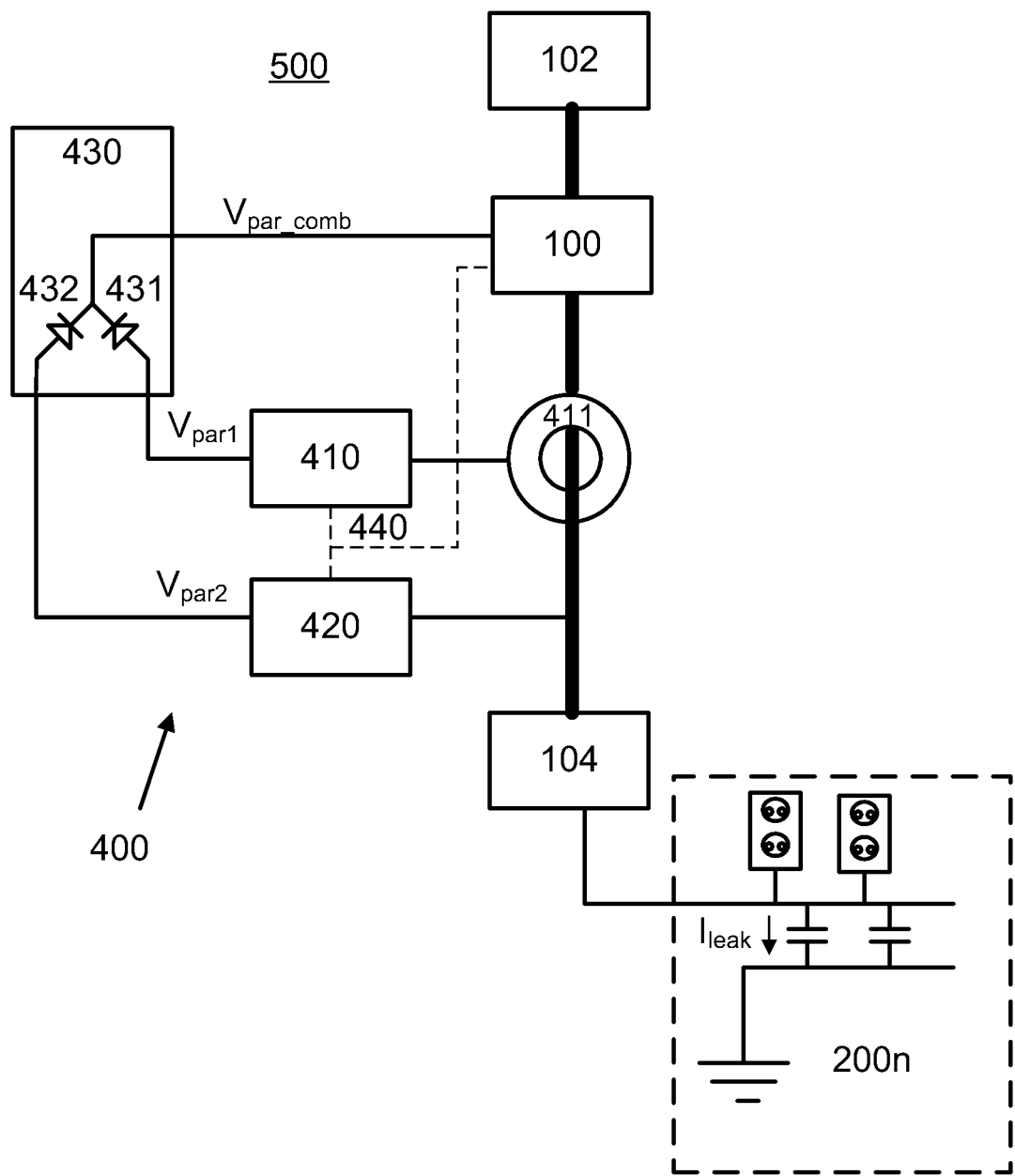
FIG. 11 shows an arrangement according to an embodiment of the invention.

FIG. 11 schematically shows an alternating current AC breaking arrangement 500 according to an aspect of the present invention. The alternating current AC breaking arrangement 500 comprises an input 102, an output 104, and an alternating current breaking circuit 100 according to any of the herein described embodiments. One or more electrical loads 200n are coupled to the output 104. Further, the alternating current AC breaking arrangement 500 comprises a power supply circuit 400 arranged to perform energy harvesting and to provide electrical power for driving the alternating current breaking circuit 100. Basically, the power supply circuit 400 is arranged to extract/draw electrical power from the alternating current AC, and is arranged to then provide the extracted electrical power to a circuit and/or a device in need of a power supply. For example, the alternating current breaking circuit 100 may here be provided with the extracted electrical power in order to drive the components included in the alternating current breaking circuit 100. For example, the controller 110 included in the circuit 100 in some embodiments needs electrical power to run.

As illustrated in FIG. 11, the power supply circuit 400 comprises a first parasite arrangement 410, which may also be denoted the high power load parasite voltage arrangement, being arranged to extract a first parasite voltage $V_{par1}$ from the alternating current AC. The first parasite arrangement 410 may comprise a transformer 411 arranged to generate the first parasite voltage $V_{par1}$ from the alternating current AC. The transformer 411 may be essentially any kind of magnetic transformer, including e.g. an iron core and at least one coil, suitable for creating the first parasite voltage $V_{par1}$ by use of induction and the magnetic field created around the alternating current. The transformer 411 may be located such that the alternating current runs through its core and/or its primary coil winding. For example, the transformer may be arranged at least partly as a ring formed unit/core/winding placed around a conductor carrying the alternating current AC.

Figure 12A:
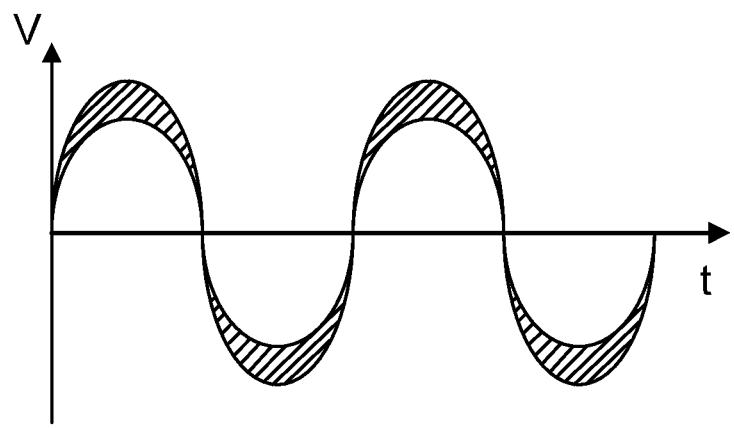
FIGS. 12a-c show some energy harvesting methods.
Figure 12B:
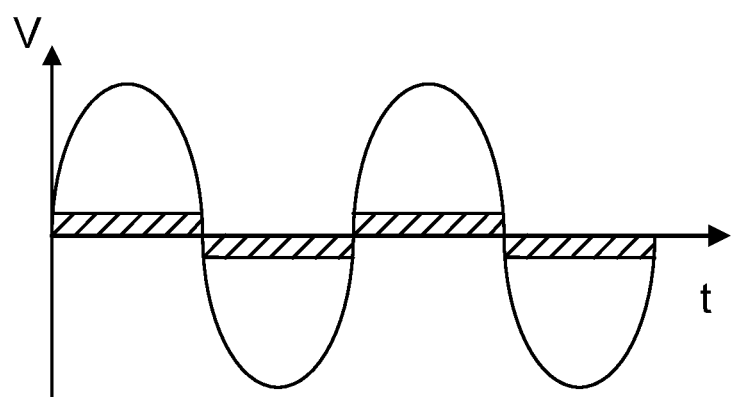
Figure 12C:
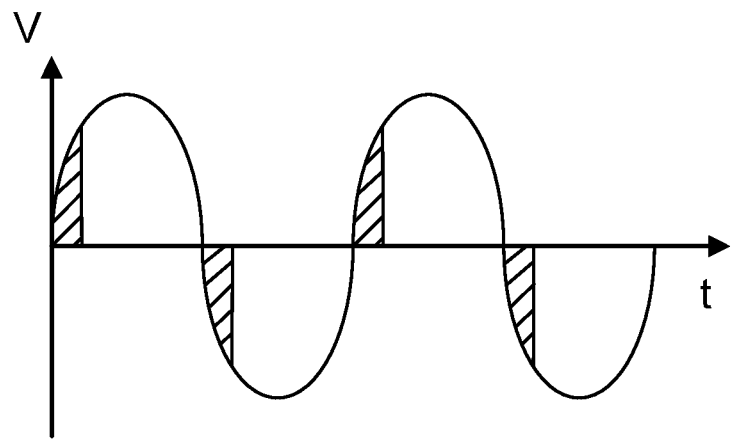

The power supply circuit 400 also comprises a second parasite arrangement 420, which may also be denoted a low power load parasite voltage arrangement, being arranged to extract a second parasite voltage $V_{par2}$ from the alternating current AC. The second parasite arrangement 420 may be arranged to extract a second parasite voltage $V_{par2}$ by extracting a portion of an amplitude of a voltage corresponding to the alternating current AC (as schematically shown in FIGS. 12a-b) and/or by extracting a time duration portion of a cycle of a voltage corresponding to the alternating current AC (as schematically shown in FIG. 12c). In FIGS. 12a-c, the portions extracted from the voltage signals are dashed. There are, as is realised by a skilled person, a number of other methods possible to use for extracting portions of the voltage signals for energy harvesting purposes. The claimed power supply circuit 400 may be configured to extract portions according to one or more of these possible methods.

The power supply circuit 400 also comprises a voltage combiner 430 being arranged to combine the first parasite voltage $V_{par1}$ and the second parasite voltage $V_{par2}$. The voltage combiner 430 may for this reason comprise two rectifying diodes 431; 432 being coupled at their inputs to the first 410 and second 420 parasite arrangements, respectively, to be fed with the first $V_{par1}$ and second $V_{par2}$ parasite voltages. The outputs of the two rectifying diodes 431; 432 are coupled together to form a combined parasite voltage $V_{par\_comb}$, which is provided to the alternating current breaking circuit 100.

According to an embodiment, the first 410 and second 420 parasite arrangements may be arranged to communicate 440 in simplex or duplex mode with each other, such that one of the first 410 and second 420 parasite arrangements is regarded as a master unit, arranged for controlling the other one of the first 410 and second 420 parasite arrangements, which is then regarded as a slave unit. Also, information may be communicated 440 to the controller 110 of the alternating current breaking circuit 100. The information provided to the controller 110 may include e.g. power consumption and/or load information. The controller 110 may then use this information to switch between active and standby modes for the controller 110.

The combined use of the first 410 and second 420 parasite arrangements is very advantageous, since they complement each other very well. The first parasite arrangement 410 works well for higher power, i.e. for stronger AC currents, since the transformer 411 is well suited to create the first parasite voltage $V_{par1}$ during strong currents. The second parasite arrangement 420, however, works poorly for strong currents, since the voltage extraction methods used by the second parasite arrangement 420 may cause heating of the second parasite arrangement 420 and/or may cause current/voltage transients and/or steps that need to be filtered. Filtering of such strong currents today demands for a bulky filter, which normally does not fit into an alternating current breaker. The second parasite arrangement 420 works well for lower power, i.e. for weaker AC currents. The first parasite arrangement 410, on the other hand, can often not extract a useful voltage from the alternating current AC if the current is not strong enough.

According to an embodiment, the first parasite arrangement 410 is used mainly for extracting the first parasite voltage $V_{par1}$ during stronger current time periods, and the second parasite arrangement 420 is used mainly for extracting the second parasite voltage $V_{par2}$ during weaker current time periods. Thus, when these two extracting methods are combined, as is performed according to the embodiment, a reliable and useful combined parasite voltage $V_{par\_comb}$ may be provided as a power supply to the alternating current AC breaking circuit 100 during essentially any condition when the one or more loads 200n consume power.

Since the first $V_{par1}$ and second $V_{par2}$ parasite voltages are extracted from the alternating current AC in series with the one or more loads, the power supply circuit 400 will always be able to provide power to the alternating current breaking circuit 100 when current is provided to the one or more active loads. Also, when the one or more loads are inactive, a leakage current $I_{leak}$ still runs to the ground/earth at the loads, which often is enough for creating at least the first $V_{par1}$ parasite voltage. Thus, a reliable and useful combined parasite voltage $V_{par\_comb}$ may be provided as a power supply to the alternating current AC breaking circuit 100 during essentially any condition, also when the one or more loads 200n do not consume power.

The invention claimed is:

1. A circuit for breaking alternating current, the circuit comprising:
    an input arranged to receive an alternating current;
    an output arranged to provide the alternating current to at least one electrical load;
    a first controllable switch and a second controllable switch coupled in series with each other and being arranged between the input and the output;
    an impedance network coupled between the first controllable switch and the second controllable switch, wherein the impedance network comprises a limiting/delay circuit coupled between the first controllable switch and the second controllable switch, wherein the limiting/delay circuit is arranged to limit/delay the speed of changes of the alternating current;
    a controller coupled to a reference ground common to the controller and the first controllable switch and the second controllable switch, wherein the controller is arranged to measure at least one measuring voltage between a node of the impedance network and the reference ground and to control the first controllable switch and the second controllable switch, so as to control the breaking of the alternating current provided to the at least one electrical load, based on the value of the measured at least one measuring voltage.

2. The circuit according to claim 1, further comprising a driver circuit coupled between the controller and each of the first controllable switch and the second controllable switch, wherein the driver circuit is arranged to amplify control signals used by the controller for controlling the first controllable switch and the second controllable switch.

3. The circuit according to claim 1, wherein the controller is further arranged to measure a first measuring voltage between a first node of the impedance network and the reference ground and a second measuring voltage between a second node of the impedance network and the reference ground, and to control the first controllable switch and the second controllable switch based on the value of the first measured measuring voltage and the second measured measuring voltage.

4. The circuit according to claim 1, wherein the limiting/delay circuit comprises an inductor.

5. The circuit according to claim 1, wherein the first controllable switch and the second controllable switch are Field Effect Transistors, (FET).

6. The circuit according to claim 5, wherein the first controllable switch and the second controllable switch are in opposite coupled between the input and the output.

7. The circuit according to claim 1, wherein the reference ground is different from the ground for the at least one electrical load.

8. The circuit according to claim 1, wherein the controller is further arranged to:
    monitor the power consumption pattern of the at least one electrical load, and
    control the first controllable switch and the second controllable switch based on the monitored power consumption pattern of the at least one electrical load.

9. The circuit according to claim 8, wherein the controller is further arranged to determine the type of the at least one electrical load based on the monitored power consumption pattern.

10. The circuit according to claim 9, wherein the controller is further arranged to control the first controllable switch and the second controllable switch based on the determined type.

11. The circuit according to claim 1, wherein the controller is further arranged to:
    receive any of at least one information element and at least one instruction associated with the at least one electrical load, and
    control the first controllable switch and the second controllable switch based on any of the at least one information element and the at least one instruction.

12. The circuit according to claim 11, wherein the controller comprises any of wireless receiving means and wired receiving means arranged to receive communication signals comprising an indication of at least any of the at least one information element and the at least one instruction element.

* * * * *